US008605894B2

(12) United States Patent
Farrugia et al.

(10) Patent No.: US 8,605,894 B2
(45) Date of Patent: Dec. 10, 2013

(54) CRYPTOGRAPHIC PROCESS EXECUTION PROTECTING AN INPUT VALUE AGAINST ATTACKS

(75) Inventors: Augustin J. Farrugia, Cupertino, CA (US); Benoit Chevallier-Mames, Paris (FR); Bruno Kindarji, Paris (FR); Mathieu Ciet, Paris (FR); Thomas Icart, Paris (FR)

(73) Assignee: Apple Inc., Cupertino, CA (US)

( * ) Notice: Subject to any disclaimer, the term of this patent is extended or adjusted under 35 U.S.C. 154(b) by 147 days.

(21) Appl. No.: 13/271,841

(22) Filed: Oct. 12, 2011

(65) Prior Publication Data

US 2013/0016836 A1 Jan. 17, 2013

Related U.S. Application Data

(60) Provisional application No. 61/507,952, filed on Jul. 14, 2011.

(51) Int. Cl.
*G06F 21/00* (2013.01)
*H04L 9/06* (2006.01)

(52) U.S. Cl.
USPC ............................................ 380/29; 380/37

(58) Field of Classification Search
None
See application file for complete search history.

(56) References Cited

U.S. PATENT DOCUMENTS

2009/0158051 A1* 6/2009 Michiels et al. .............. 713/189
2010/0303231 A1* 12/2010 Gorissen et al. .............. 380/210

OTHER PUBLICATIONS

"Advanced Encryption Standard (AES)," *Federal Information Processing Standards Publication 197* (*FIPS Pubs*), National Institute of Standards and Technology (NIST), Nov. 26, 2001 [retreived on Aug. 7, 2013], http://csrc.nist.gov/publications/fips/fips197/fips-197.pdf.
Billet, Olivier, et al., "Cryptanalysis of a White Box AES Implementation," *Selected Areas in Cryptography 2004* (*SAC 2004*), pp. 227-240.
Chow, S. , et al., "White-Box Cryptography and an AES Implementation", *Lecture Notes in Computer Science* vol. 2595, Revised Papers from the 9th Annual International Workshop on Selected Areas in Cryptography, pp. 250-270, (2002).

* cited by examiner

*Primary Examiner* — Gilberto Barron, Jr.
*Assistant Examiner* — Izunna Okeke
(74) *Attorney, Agent, or Firm* — Blakely, Sokoloff, Taylor & Zafman LLP

(57) ABSTRACT

A cryptographic process (such as the AES cipher) which uses table look up operations (TLUs) is hardened against reverse engineering attacks intended to recover the table contents and thereby the cipher key. This hardening involves removing any one-to-one correspondence between the TLU inputs and outputs, by altering the output of the TLU dynamically, e.g. at each execution (call) of the TLU. This is done by increasing the size of the tables, applying a dynamically determined mask value to the table input and/or output, or using an inverse of the table.

24 Claims, 3 Drawing Sheets

CRYPTOGRAPHIC PROCESS EXECUTION PROTECTING AN INPUT VALUE AGAINST ATTACKS

CROSS-REFERENCE TO RELATED APPLICATIONS

This U.S. application Ser. No.: 13/271,841, filed Oct. 12, 2011 claims the benefit under 35 U.S.C. §119(e) of U.S. Provisional Application Ser. No. 61/507,952, filed Jul. 14, 2011, the contents of each of which is incorporated herein by reference in its entirety.

FIELD OF THE INVENTION

This invention relates to data security, cryptography and cipher key protection.

BACKGROUND

Cryptographic algorithms are widely used for encryption and decryption of messages, authentication, digital signatures and identification. In the field of data security, there is a need for fast and secure encryption. This is why the AES (Advanced Encryption Standard) cipher has been designed and standardized to replace the DES (Data Encryption Standard) cipher. AES is a well known symmetric block cipher. Block ciphers operate on blocks of plaintext and ciphertext, usually of 64 or 128 bits length but sometimes longer. Stream ciphers are the other main type of cipher and operate on streams of plain text and cipher text 1 bit or byte (sometimes one word) at a time. There are modes of operation (notably the ECB, electronic code block) where a given block is encrypted to always the same ciphertext block. This is an issue which is solved by a more evolved mode of operations, e.g. CBC (cipher block chaining) where a chaining value is used to solve the 1-to-1 map.

AES is approved as an encryption standard by the U.S. Government. Unlike its predecessor DES (Data Encryption Standard), it is a substitution permutation network (SPN). AES is fast to execute in both computer software and hardware implementation, relatively easy to implement, and requires little memory. AES has a fixed block size of 128 bits and a key size of 128, 192 or 256 bits. Due to the fixed block size of 128 bits, AES operates on a 4×4 array of bytes. It uses key expansion and like most block ciphers a set of encryption and decryption rounds (iterations). Each round involves the same processes. Use of multiple rounds enhances security. Block ciphers of this type include in each round use of a substitution box (S-box). This operation provides non-linearity in the cipher and significantly enhances security.

Note that these block ciphers are symmetric ciphers, meaning the same key is used for encryption and decryption. As is typical in most modern ciphers, security rests with the (secret) key rather than the algorithm. The S-boxes accept an n-bit input and provide an m-bit output. The values of m and n vary with the cipher and the S-box itself. The input bits specify an entry in the S-box in a particular manner well known in the field.

Many encryption algorithms are primarily concerned with producing encrypted data that is resistant to decrypting by an attacker who can interact with the encryption algorithm only as a "Black Box" (input-output) model, and cannot observe internal workings of the algorithm or memory contents, etc due to lack of system access. The Black Box model is appropriate for applications where trusted parties control the computing systems for both encoding and decoding ciphered materials.

However, many applications of encryption do not allow for the assumption that an attacker cannot access internal workings of the algorithm. For example, encrypted digital media often needs to be decrypted on computing systems that are completely controlled by an adversary (attacker). There are many degrees to which the Black Box model can be relaxed. An extreme relaxation is called the "White Box" model. In a White Box model, it is presumed that an attacker has total access to the system performing an encryption, including being able to observe directly a state of memory, program execution, modifying an execution, etc. In such a model, an encryption key can be observed in or extracted from memory, and so ways to conceal operations indicative of a secret key are important.

Classically, software implementations of cryptographic building blocks are insecure in the White Box threat model where the attacker controls the execution process. The attacker can easily lift the secret key from memory by just observing the operations acting on the secret key. For example, the attacker can learn the secret key of an AES software implementation by observing the execution of the key schedule algorithm.

Hence there are two basic principles in the implementation of secure computer applications (software). The Black Box model implicitly supposes that the user does not have access to the computer code nor any cryptographic keys themselves. The computer code security is based on the tampering resistance over which the application is running, as this is typically the case with SmartCards. For the White Box model, it is assumed the (hostile) user has partially or fully access to the implemented code algorithms; including the cryptographic keys themselves. It is assumed the user can also become an attacker and can try to modify or duplicate the code since he has full access to it in a binary (object code) form. The White Box implementations are widely used (in particular) in content protection applications to protect e.g. audio and video content.

Software implementations of cryptographic building blocks are insecure in the White Box threat model where the attacker controls the computer execution process. The attacker can easily extract the (secret) key from the memory by just observing the operations acting on the secret key. For instance, the attacker can learn the secret key of an AES cipher software implementation by passively monitoring the execution of the key schedule algorithm. Also, the attacker could be able to retrieve partial cryptographic result and use it in another context (using in a standalone code, or injecting it in another program, as an example).

Content protection applications such as for audio and video data are one instance where it is desired to keep the attacker from finding the secret key even though the attacker has complete control of the execution process. The publication "White-Box Cryptography in an AES implementation" Lecture Notes in Computer Science Vol. 2595, Revised Papers from the 9th Annual International Workshop on Selected Areas in Cryptography pp. 250-270 (2002) by Chow et al. discloses implementations of AES that obscure the operations performed during AES by using table lookups (also referred to as TLUs) to obscure the secret key within the table lookups, and obscure intermediate state information that would otherwise be available in arithmetic implementations of AES. In the computer field, a table lookup table is an operation consisting of looking in a table (also called an array) at a given index position in the table.

Chow et al. (for his White Box implementation where the key is known at the computer code compilation time) uses 160 separate tables to implement the 11 AddRoundKey operations and 10 SubByte Operations (10 rounds, with 16 tables per round, where each table is for 1 byte of the 16 byte long—128 bit—AES block). These 160 tables embed a particular AES key, such that output from lookups involving these tables embeds data that would normally result from the AddRoundKey and SubByte operations of the AES algorithm, except that this data includes input/output permutations that make it more difficult to determine what parts of these tables represent round key information derived from the AES key. Chow et al. provide a construction of the AES algorithm for such White Box model. The security of this construction resides in the use of table lookups and masked data. The input and output mask applied to this data is never removed along the process. In this solution, there is a need for knowing the key value at the compilation time, or at least to be able to derive the tables from the original key in a secure environment.

The conventional implementation of a block cipher in the White Box model is carried out by creating a set of table lookups. Given a dedicated cipher key, the goal is to store in a table the results for all the possible input messages. This principle is applied for each basic operation of the block cipher. In the case of the AES cipher, these are the shiftRow, the add RoundKey, the subByte and the mixColumns operations.

Further, the publication "Cryptanalysis of a White Box AES Implementation" by Olivier Billet et al., in "Selected Areas in Cryptography 2004" (SAC 2004), pages 227-240 is a successful attack on a White Box cipher of the type described by Chow et al., indicating weaknesses in Chow et al.'s approach. Software implementations of cryptographic building blocks are thus insecure in the White Box threat model where the attacker controls the execution process. The attacker can easily lift the secret key from memory by just observing the operations acting on the secret key. For example, the attacker can learn the secret key of an AES software implementation by observing the execution of the key schedule algorithm.

Content protection applications are one instance where it is desired to keep the attacker from finding the (secret) cryptographic key even though the attacker has complete control of the execution process. The publication by Stanley Chow, Philip A. Eisen, Harold Johnson, Paul C. van Oorschot: White-Box Cryptography and an AES Implementation. Selected Areas in Cryptography 2002: 250-270 is another publication which gives a construction of the AES algorithm for such a White Box model. The security of this construction resides in the use of table lookups and masked data. The input and output mask applied to this data is never removed along the process. In this solution, there is a need to know the key value at the compilation time, or at least to be able to derive the tables from the original key in a secure environment.

However, the Chow et al. White Box solution does not solve all needs for block cipher operations. Indeed, the case where a cryptographic key is derived through a given process and thus unknown at the code compilation time is not provided for.

The security of Chow et al. resides in the use of table lookups and masked data. The input and output mask applied to this data is never removed during the process. In this solution, there is a need to know the key value at the compilation time, or at least to be able to derive the tables from the original key in a secure environment.

SUMMARY

One typical case is when computer software to carry out a cryptographic process is distributed over several users and each one of them has his own cryptographic key; this key set is, from a practical point of view, impossible to disseminate to each user. Another case is when generating session keys (a different key for each session) through a given process. Of course, in this case the key is unknown at the code (software) compilation time. A last case is when it is necessary to store a large number of keys. It is not reasonable to consider storing about 700 kB of data for each key (since these keys are very lengthy).

Hiding the keys of an AES execution is an important part of the AES White Box implementation. The present method protects the White Box versions of the AES cipher (or other cryptographic processes) against reverse engineering. The method recomputes a part (or all) of the table look-ups during the process computation (code run time) or at the source code compilation time by embedding more tables than needed. This results in memory accesses which vary for each execution (use) of the table, hardening the code against reverse-engineering.

The present solutions apply to virtually any cryptographic algorithms, implemented in a White Box version or other, which use table look-ups. The present method protects against reverse engineering attacks. More generally, the idea applies virtually to any White Box cryptographic process or algorithm.

DETAILED DESCRIPTION

AES Description

Figure 1:
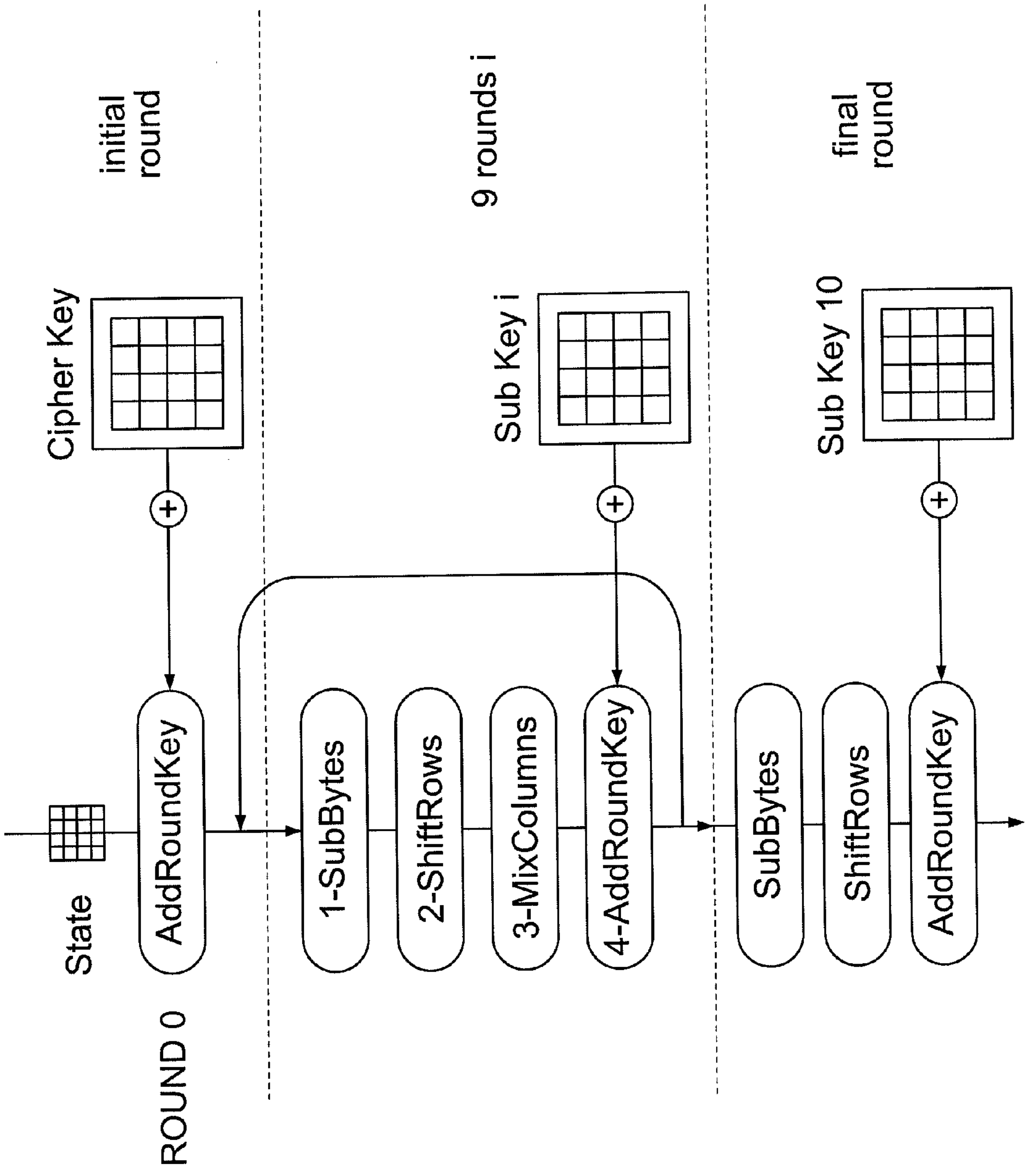
FIG. 1 shows, in the prior art, AES encryption.

See the NIST AES standard for a more detailed description of the AES cipher: Specification for the ADVANCED ENCRYPTION STANDARD (AES), NIST, http://csrc.nist.gov/publications/fips/fips197/fips-197.pdf. The following is a summary of the well known AES cipher. The AES cipher uses a 16 byte cipher key, and has 10 rounds (final found plus 9 others). The AES encryption algorithm has the following operations as depicted graphically in prior art FIG. 1 and showing round zero of the 9 rounds:

11 AddRoundKey Operations
10 SubByte Operations
10 ShiftRow Operations
9 MixColumn Operations AES is computed using a 16-byte buffer (computer memory) referred to as the AES "state" in this disclosure and shown in FIG. 1.

To summarize, (i) AddRoundKeys (ARK) logically XOR (the Boolean exclusive OR operation) some sub-key bytes with the state bytes.

(ii) ShiftRows (SR) are a move from one byte location to another.

(iii) MixColums (MC) are a linear table-look up (TLU), applied to 4 bytes.

(iv) SubBytes (SB) are a non-linear TLU, applied to 1 byte.

Preliminarily to the encryption itself, in the initial round in FIG. 1, the original 16-byte cipher key is expanded to 11 sub-keys (also called round keys) designated K0, . . . , K10, so there is a sub-key for each round, during what is called the key-schedule. Each sub-key, like the original cipher key, is 16-bytes long.

The following explains AES decryption round by round. For the corresponding encryption (see FIG. 1), one generally performs the inverse of each operation, in the inverse order. (The same is true for the cryptographic processes in accordance with the invention as set forth below.) The inverse operation of ARK is ARK itself, the inverse operation of SB is the inverse subbyte (ISB) which is basically another TLU, the inverse operation of MC is the inverse mix column (IMC) which is basically another TLU, and the inverse operation of SR is the inverse shift row (ISR) which is another move from one byte location to another.

Expressed schematically, AES decryption round-by-round is as follows:

ARK (K10)
ISR
ISB
ARK (K9)
IMC
ISR
ISB
ARK (K8)
IMC
ISR
ISB
ARK (K7)
IMC
ISR
ISB
ARK (K6)
IMC
ISR
ISB
ARK (K5)
IMC
ISR
ISB
ARK (K4)
IMC
ISR
ISB
ARK (K3)
IMC
ISR
ISB
ARK (K2)
IMC
ISR
ISB
ARK (K1)
IMC
ISR
ISB
ARK (K0)

The method in accordance with the invention also can easily be applied to other variants of AES with more rounds (the 192 and 256-bit key length versions) as well as to other block ciphers and more generally to non-block ciphers and other key based cryptographic processes.

AES is considered very efficient in terms of execution on many different computer architectures since it can be executed only with table lookups (TLU) and the exclusive-or (XOR) operation. As well known, in the SB operation, each data byte in the array (state) is updated using an 8-bit substitution box called the S-box. So often, symmetric cryptographic processes use S-boxes, which are tables or arrays. Then in the associated computer code, there are many table lookup (TLU) operations. In the computer field, a look-up table is a data structure, usually an array of data, which replaces a computation with an indexed array operation. The input to the table is the "index," which is used to find an element in the array having that index (memory location) value. The output of the TLU is the value or data entry present at that particular (memory) location. In some computer programming languages (such as "C"), there are pointer functions (or offsets to the index) to process the input value. This is also referred to as "pointer arithmetic." Table look-ups may be embodied in hardware (memory) or software. Pointers can be absolute (the actual physical address in memory) or relative (an offset from an absolute start address).

When the input to such a table is related to a (secret) key k, it is desirable to avoid giving the attacker a way to recover this input. In other words, a goal is to protect these input values as specific targets from an attacker who is seeking to recover the key k. There are known attacks whose aim is to recover this input, designated x, in order to recover the secret key. Even if input x is transformed into a function of x, designated f(x) for a secret function f, there are in some cases more complex attacks that are able to recover the key k from the value of f(x) even if the function f is kept secret from the attacker.

The present method counteracts this kind of attack, avoiding any clear one-to-one mapping between the "clear" value (or "state") by x (i.e., the value corresponding to the same quantity when one does the computation in the regular non-protected process) and the input to the TLU. This means avoiding the situation that for any input value x, the input to the TLU is some value y=f(x), f being a one-to-one function.

In order to remove such a possible one-to-one mapping between a clear state and a masked input to a TLU (corresponding to a similar step in cryptographic process such as an S-box operation), the look-up table is changed for each use (i.e., call to the look-up table) as in the following embodiments.

First Embodiment

One can recompute the tables at each use (call), by changing their input and output masks for each use. An example of this is as expressed in pseudo-code (a non-executable representation of computer code) as:

```
/* At each call, change */
maskin = GetRandom( )
maskout = GetRandom( )
Tnew[i] = T [i XOR maskin] XOR maskout
```

where T is, e.g., the S-box or other TLU used in the original cryptographic process and "XOR" denotes applying by the Boolean XOR operation the indicated random or pseudo random number input and output mask values, designated here respectively maskin and maskout.

So here one replaces:

```
z=T[y]
```

with:

```
ymasked = y XOR maskin
zmasked = Tnew[ymasked]
z = zmasked XOR maskout
```

where Tnew is calculated as shown above. Further, the table Tnew is regenerated (with different mask values of maskin and maskout) as frequently as possible, to enhance security.

This method can be generalized. One recomputes the tables at each use, by changing their input and output transformation (which can be any kind of permutation in its generalized form) at each use, where the transformation is a generic way to change a table in such a way that one can still use the table in the cryptographic process.

Second Embodiment

Another relatively simple (but not highly secure) method to do this is expressed in pseudo-code as:

Tnew[i]=Told[P[i]]

for a randomly chosen permutation function designated P, whose inverse function is designated invP. Here TLU operation Told is the original TLU operation, and is replaced by Tnew, where i is the table index. To use this table look-up, one must call and execute function invP on x before calling the operation Tnew, since one wants to compute Told[x]=Tnew[invP(x)]. But then the attacker could perform his attack directly on function invP, so this solution is not highly secure.

Third Embodiment

This method replaces the conventional computer code (or pseudo-code) performing a TLU operation designated T on index y and returns value z, expressed algebraically as:

( . . . )

z=T[y]

with the following (commentated) pseudo-code:

```
/* Change the pt */
dynmask = GetARandom( );        /* Get a random */
pt = T − dynmask                /* Change the pointer */
(...)
/* Perform the TLU */
ychanged = y + dynmask;
z = pt[ychanged]
```

Here T is the table address, where T[0] to e.g. T[255] is the table to be protected. So the instruction "pt=T−dynmask" is a computation on the table address. The notation "/*" and "*/" conventionally surrounds a comment. Function "GetARandom( )" when called generates a random number, and "pt" is a pointer (relative memory address) value. The size (length in bits) of the generated random number should be at least the same as that of y, for good security. All addition and subtraction operations are performed on the integers, or performed modulo a given integer value larger than T (the address) so as not to lose any information. Typically the modulo value is $2^{32}$ or $2^{64}$. Thereby the operation is such that no register (memory) overflow occurs in either variable ychanged or in pt. If this is not the case, the behavior or execution z or result would be incorrect and problematic in terms of security.

To summarize, this replaces the original TLU operation expressed as z=T[y] with a new secure TLU operation using a dynamically selected random number designated dynmask. The input value for the TLU accesses thereby changes each time this part of the cryptographic process is executed (called). This is intended to avoid a one-to-one mapping, as explained above. However, the physical address of the relevant entry in the table is still a function of y (and so of x), which is somewhat insecure: indeed, this address is equal to:

$pt+y\text{changed}=T+y$

Fourth Embodiment

This embodiment doubles the size (in terms of the number of cells or entries) of the conventional table T (denoted sizeofT below) either at the code generation (source code compilation) time, or when the source code is written, expressed as follows:

```
/* Double T */
for (i = 0 to 2*sizeofT)
    doubleT(...)[i % sizeofT]
```

Here i is an iteration index value, "sizeofT" is a value of the number of entries in table T, and "%" is the modulo operation. Then, one replaces the usual TLU expressed as:

( . . . )

z=T[y]

with (in commentated pseudo-code):

```
/* Take a random */
dynmask = GetARandom( ) % sizeofT /* Get a random */
/* Use the double table */
pt = doubleT + dynmask
ychanged = (y − dynmask) % sizeofT
z = pt[ychanged]
```

Variable "doubleT" indicates the original TLU operation table T which is doubled in length by appending a copy of table T to itself as explained above.

The following is an example of this. A table look-up T[3] can be computed either as doubleT[3] or as doubleT[sizeofT+3]. Indeed, if the table input y=3, one can have:

$pt+y\text{changed}=\text{double}T+3$, if dynmask≤3 1.

$pt+y\text{changed}=\text{double}T+\text{sizeOf}T+3$, if dynmask>3 2.

Thus the input to the TLU is changed (it is ychanged), but even the address used is different and so this is more secure than in the second embodiment.

Extensions to more than double sized tables are readily apparent—e.g., triple or quad sized tables. But in some applications, one cannot increase the table size due to limitations on the amount of associated computer code.

Fifth Embodiment

In this method, let operation T be an 8-bit permutation. So for all elements i in the set [0, . . . , 255], T[i] is different and 0≤T[i]<256. So T is a bijection from [0, . . . , 255] to itself.

Designate invT as the inverse of T, so:

invT[T[i]]=i, for all i in [0, . . . , 255]

Suppose the TLU code is, at the code generation time:

take a random value (number) c compute $U[i]=T[(\text{inv}T[i]-c)\%\ 256]$

At the code execution time, the conventional table look up access:

z=T[x]

can be replaced by (using identities):

$y=(x+c)\%\ 256$ v=T[y]

z=U[v]

or by:

$y=(x+2*c)\ \%\ 256$ v=T[y]

z=U[U[v]]

The above example can be generalized and automatized as follows:

At the first use in the cryptographic process:

```
keep=0;

for (1=0 to sizeofU)

UpowerK[i]=i

( . . . )
```

At each subsequent use, do the following:

```
/* Computation */
ychanged = (y + keep) % 256
v = T[y]
z = UpowerK[v]
/* And change for next time */
keep = (keep + c) % 256
for (i = 0 to sizeofU)
      UpowerK[i]=U[UpowerK[i]]
```

Then each time, the value x is changed. At the first time, x is used as y=f(x), then the second time, as y+c, then as y+2c the third time, etc.

For a variation, the above +c computation is replaced by any function f where function f is mathematically invertible. Note that in the above example, f(x)=(x+c) % 256, has as its inverse function $f^{1}$(y)=(y−c) % 256 which is implemented in the U table look-up. Then, instead of computing y=(x+k*c) % 256, one computes y=f(f( . . . (f(x)) . . . ) where function f is applied k times. Note that for this embodiment (unlike the others) the table T must be a permutation. Also, this method can be extended to permutations greater than on 8 bits (256 entries in the tables). The modulo operations are adapted to the number of elements.

Figure 2:
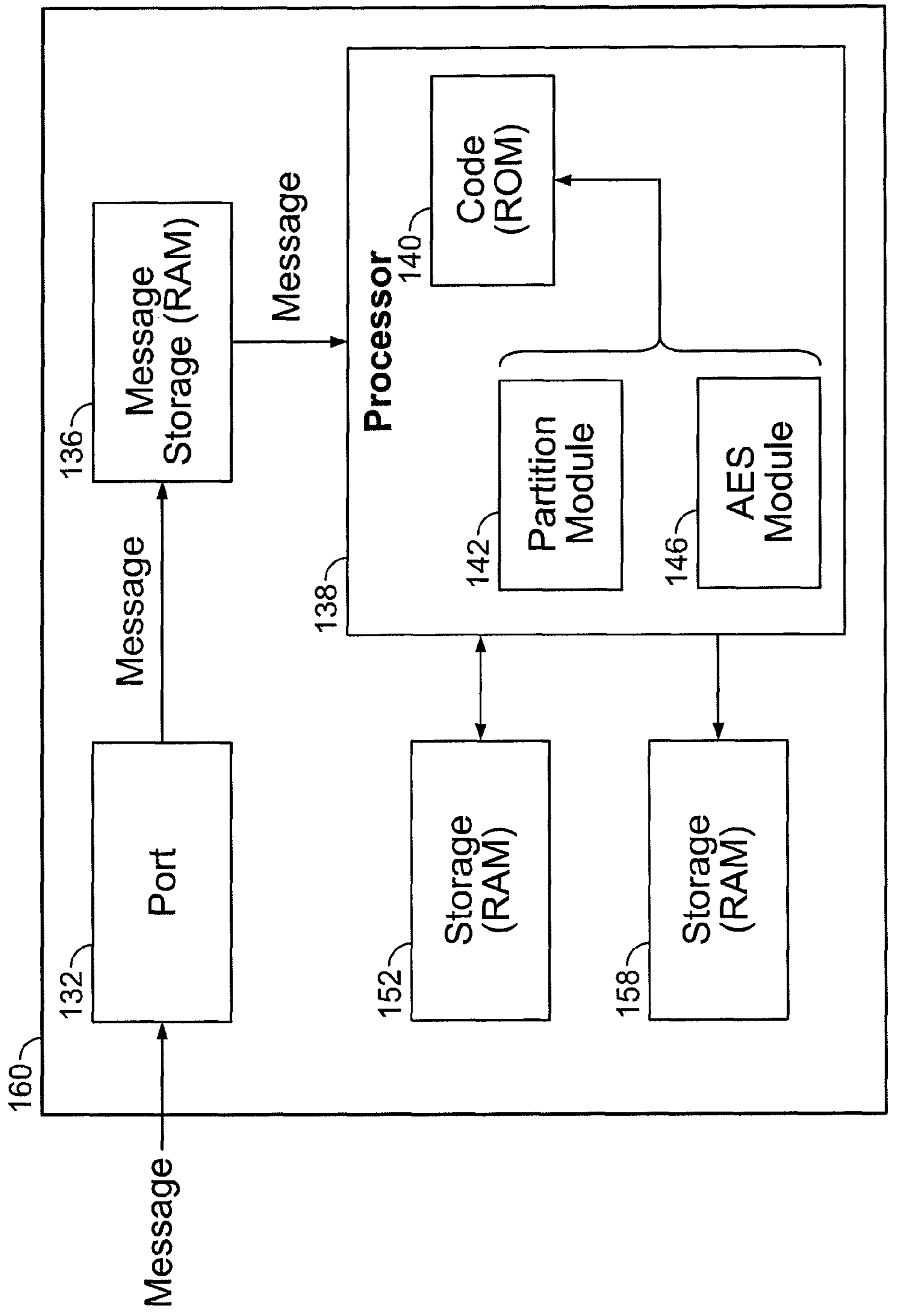
FIG. 2 shows a computing system in accordance with the invention.

FIG. 2 shows in a block diagram relevant portions of a computing device (system) 160 in accordance with the invention which carries out the method and its associated cryptographic processes as described above. This is, e.g., a server platform, computer, mobile telephone, Smart Phone, personal digital assistant or similar device, or part of such a device and includes conventional hardware components executing in one embodiment software (computer code) which carries out the above examples. This code may be, e.g., in the C or C++ computer language or its functionality may be expressed in the form of firmware or hardware logic; writing such code or designing such logic in accordance with the invention would be routine in light of the above examples and logical expressions. Of course, the above examples are not limiting. Only relevant portions of this apparatus are shown for simplicity.

The computer code for carrying out the cryptographic process is conventionally stored in code memory (computer readable storage medium) 140 (as object code or source code) associated with conventional processor 138 for execution by processor 138. The incoming conventional message to be encrypted or decrypted (in digital form) is received at port 132 and stored in computer readable storage (memory 136 where it is coupled to processor 138. Processor 138 conventionally then partitions the message into suitable length blocks using conventional partitioning module 142. Another software (code) module in processor 138 is the decryption (or encryption) module 146 which carries out the decryption (or encryption) functions set forth above on the message, with its associated computer readable storage (memory) 152.

Also coupled to processor 138 is a computer readable storage (memory) 158 for the resulting decrypted or encrypted message. Storage locations 136, 140, 152, 158 may be in one or several conventional physical memory devices (such as semiconductor RAM or its variants or a hard disk drive). Electric signals conventionally are carried between the various elements of FIG. 2. Not shown in FIG. 2 is any subsequent conventional use of the resulting encrypted or decrypted message stored in storage 145.

Figure 3:
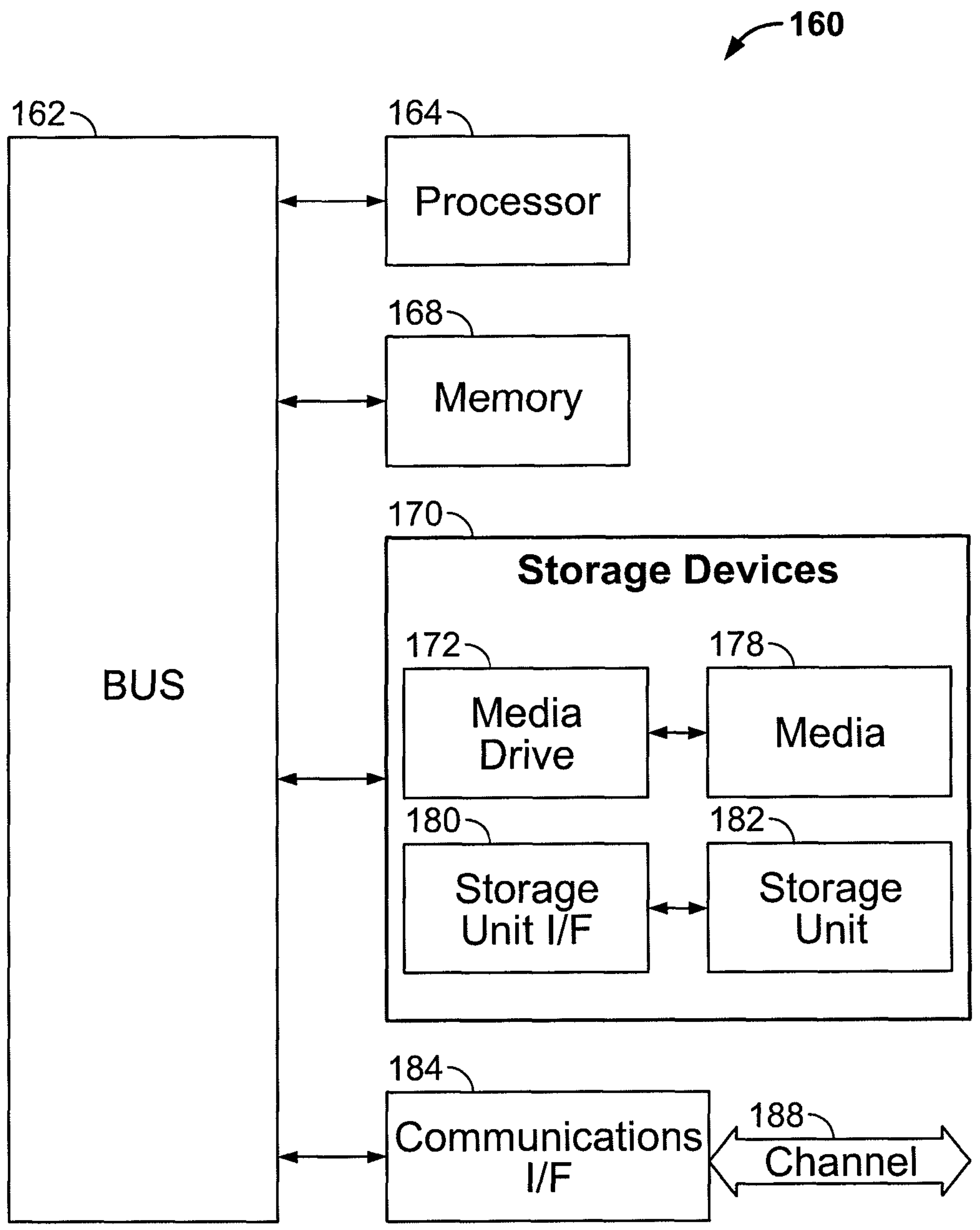
FIG. 3 shows a computing system as known in the art and used in accordance with the invention.

FIG. 3 illustrates detail of a typical and conventional embodiment of computing system 160 that may be employed to implement processing functionality in embodiments of the invention as indicated in FIG. 2 and includes corresponding elements. Computing systems of this type may be used in a computer server or user (client) computer or other computing device, for example. Those skilled in the relevant art will also recognize how to implement embodiments of the invention using other computer systems or architectures. Computing system 160 may represent, for example, a desktop, laptop or notebook computer, hand-held computing device (personal digital assistant (PDA), cell phone, palmtop, etc.), mainframe, server, client, or any other type of special or general purpose computing device as may be desirable or appropriate for a given application or environment. Computing system 160 can include one or more processors, such as a processor 164 (equivalent to processor 138 in FIG. 2). Processor 164 can be implemented using a general or special purpose processing engine such as, for example, a microprocessor, microcontroller or other control logic. In this example, processor 164 is connected to a bus 162 or other communications medium.

Computing system 160 can also include a main memory 168 (equivalent of memories 136, 140, 152, and 158), such as random access memory (RAM) or other dynamic memory, for storing information and instructions to be executed by processor 164. Main memory 168 also may be used for storing temporary variables or other intermediate information during execution of instructions to be executed by processor 164. Computing system 160 may likewise include a read only memory (ROM) or other static storage device coupled to bus 162 for storing static information and instructions for processor 164.

Computing system 160 may also include information storage system 170, which may include, for example, a media drive 162 and a removable storage interface 180. The media drive 172 may include a drive or other mechanism to support fixed or removable storage media, such as flash memory, a hard disk drive, a floppy disk drive, a magnetic tape drive, an optical disk drive, a compact disk (CD) or digital versatile disk (DVD) drive (R or RW), or other removable or fixed media drive. Storage media 178 may include, for example, a hard disk, floppy disk, magnetic tape, optical disk, CD or DVD, or other fixed or removable medium that is read by and written to by media drive 72. As these examples illustrate, the storage media 178 may include a computer-readable storage medium having stored therein particular computer software or data.

In alternative embodiments, information storage system 170 may include other similar components for allowing computer programs or other instructions or data to be loaded into computing system 160. Such components may include, for example, a removable storage unit 182 and an interface 180, such as a program cartridge and cartridge interface, a removable memory (for example, a flash memory or other removable memory module) and memory slot, and other removable storage units 182 and interfaces 180 that allow software and data to be transferred from the removable storage unit 178 to computing system 160.

Computing system 160 can also include a communications interface 184 (equivalent to element 132 in FIG. 2). Communications interface 184 can be used to allow software and data to be transferred between computing system 160 and external devices. Examples of communications interface 184 can include a modem, a network interface (such as an Ethernet or other network interface card (NIC)), a communications port (such as for example, a USB port), a PCMCIA slot and card, etc. Software and data transferred via communications interface 184 are in the form of signals which can be electronic, electromagnetic, optical or other signals capable of being received by communications interface 184. These signals are provided to communications interface 184 via a channel 188. This channel 188 may carry signals and may be implemented using a wireless medium, wire or cable, fiber optics, or other communications medium. Some examples of a channel include a phone line, a cellular phone link, an RF link, a network interface, a local or wide area network, and other communications channels.

In this disclosure, the terms "computer program product," "computer-readable medium" and the like may be used generally to refer to media such as, for example, memory 168, storage device 178, or storage unit 182. These and other forms of computer-readable media may store one or more instructions for use by processor 164, to cause the processor to perform specified operations. Such instructions, generally referred to as "computer program code" (which may be grouped in the form of computer programs or other groupings), when executed, enable the computing system 160 to perform functions of embodiments of the invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 160 using, for example, removable storage drive 174, drive 172 or communications interface 184. The control logic (in this example, software instructions or computer program code), when executed by the processor 164, causes the processor 164 to perform the functions of embodiments of the invention as described herein.

This disclosure is illustrative and not limiting. Further modifications will be apparent to these skilled in the art in light of this disclosure and are intended to fall within the scope of the appended claims.

We claim:

1. A method of performing a cryptographic process having a plurality of operations on a message, the method comprising:

receiving the message at a port;

storing the message in a first computer readable storage medium coupled to the port;

at a processor coupled to the first computer readable memory, applying a plurality of cipher operations sequentially to the message thereby generating a state for each operation;

wherein at least one of the operations includes a table lookup, and wherein the table or an input to the table lookup is caused to be different at each execution of the table lookup; and storing each state in a second computer readable medium coupled to the processor;

wherein at each execution a number is combined with the input, and the number is combined with a result of the table lookup, the number being randomly or pseudo randomly selected at each execution, and wherein after at least one execution, the table includes at least two portions each portion including a plurality of identical entries, the at least two portions at least doubling the original size of the table.

2. The method of claim 1, wherein the cryptographic process is a block cipher which includes a plurality of rounds, each round having an associated round key, each round including the plurality of cipher operation.

3. The method of claim 1, wherein the cryptographic process is encryption or decryption and the message is respectively a cleartext or a ciphertext.

4. The method of claim 2, wherein each round includes at least three of an add round key operation, a mix column operation, a subbyte operation, and a shift row operation, or an inverse thereof.

5. The method of claim 1, further comprising:

providing a pointer to the table as the input to the table lookup;

subtracting the random or pseudo random number from a value of the pointer; and performing the table lookup using the resulting subtratrend.

6. The method of claim 1, wherein the combining is arithmetic.

7. The method of claim 1, wherein a value of the number is such as to limit a number of bits in the altered input and the altered result to a predetermined value.

8. The method of claim 1, further comprising:

providing a pointer to the table as the input to the table lookup;

adding the random or pseudo random number to a value of the pointer; and performing the table lookup using the resulting sum.

9. The method of claim 1, wherein the table lookup is performed as a permutation operation on an inverse of the permutation operation.

10. The method of claim 9, further comprising:

providing an invertible function; and performing the table lookup on the invertible function of the inverse of the table lookup;

wherein for each successive table lookup, the function is applied to the inverse an additional time.

11. The method of claim 7, wherein at each execution of the table lookup, a different multiple of the number is arithmetically combined with the input.

12. The method of claim 1, wherein the number is logically combined with the input value, and further logically combining a second number with the result of the table lookup, the second number being randomly or pseudo randomly selected at each execution.

13. The method of claim 12, further comprising:

wherein the second number is random or pseudo random; and recomputing each result of the table lookup as a logical combination of the original table lookup and the two numbers;

wherein the table is a substitution box cipher operation.

14. A non-transitory computer readable medium storing computer code for carrying out the method of claim 1.

15. A computing apparatus for performing a cryptographic process including a plurality of operations on a message, comprising:

a port adapted to receive the message;

a first computer readable storage medium coupled to the port and adapted to store the message;

a processor coupled to the first computer readable memory, the processor applying a plurality of cipher operations sequentially to the message thereby generating a state for each operation;

wherein at least one of the operations includes a table lookup, and wherein the table or an input to the table lookup is caused to be different at each execution of the table lookup; and a second computer readable medium coupled to the processor and adapted to store the state;

wherein at each execution a number is combined with the input, and the number is combined with a result of the table lookup, the number being randomly or pseudo randomly selected at each execution, and wherein after at least one execution, the table includes at least two portions each portion including a plurality of identical entries, the at least two portions at least doubling the original size of the table.

16. The apparatus of claim 15, wherein the cryptographic process is a block cipher which includes a plurality of rounds, each round having an associated round key, each round including the plurality of cipher operation.

17. The apparatus of claim 15, wherein the cryptographic process is encryption or decryption and the message is respectively a cleartext or a ciphertext.

18. The apparatus of claim 16, wherein each round includes at least three of an add round key operation, a mix column operation, a subbyte operation, and a shift row operation, or an inverse thereof.

19. The apparatus of claim 15, wherein the combining is arithmetic.

20. The apparatus of claim 15, wherein a value of the number is such as to limit a number of bits in the altered input and the altered result to a predetermined value.

21. The apparatus of claim 15, further wherein the table includes at least two portions each portion including a plurality of entries which are identical.

22. The apparatus of claim 15, wherein the table lookup is performed as a permutation operation on an inverse of the permutation operation.

23. The apparatus of claim 21, wherein at each execution of the table lookup, a different multiple of the number is arithmetically combined with the input.

24. The apparatus of claim 15, wherein the number is logically combined by the processor with the input value, and further logically combining a second number with the result of the table lookup, the second number being randomly or psudeo randomly selected at each execution.

* * * * *